United States Patent

Nakakubo et al.

[11] Patent Number: 5,538,478
[45] Date of Patent: Jul. 23, 1996

[54] PREVENTIVE STRUCTURE FOR PREVENTING EXTRAORDINARY DEFORMATION OF A DIAPHRAGM OF AN OIL HERMETIC TYPE TENSIONER

[75] Inventors: Katsuya Nakakubo, Iruma; Hiroyuki Miyake, Hanno, both of Japan

[73] Assignee: Tsubakimoto Chain Co., Osaka, Japan

[21] Appl. No.: 407,898

[22] Filed: Mar. 21, 1995

[30] Foreign Application Priority Data

Apr. 1, 1994 [JP] Japan .................................. 6-085238

[51] Int. Cl.⁶ ...................................................... F16H 7/08
[52] U.S. Cl. ............................. 474/110; 92/98 D; 138/30
[58] Field of Search ............................. 60/585; 92/98 D; 138/30; 474/110, 135

[56] References Cited

U.S. PATENT DOCUMENTS

| | | | |
|---|---|---|---|
| 3,082,792 | 3/1963 | Jenkins | 92/98 D |
| 3,646,854 | 3/1972 | Bradley et al. | 92/98 D |
| 3,776,107 | 12/1973 | Molus | 92/99 |
| 3,999,266 | 12/1976 | Parker | 92/98 D |
| 4,607,737 | 8/1986 | Hans et al. | 92/98 D |
| 4,708,696 | 11/1987 | Kimura et al. | |
| 4,713,044 | 12/1987 | Nakamura et al. | |
| 4,909,777 | 3/1990 | Inoue et al. | |

FOREIGN PATENT DOCUMENTS 1182914 12/1964 Germany ................................ 92/98 D

*Primary Examiner*—Thomas E. Denion
*Attorney, Agent, or Firm*—Armstrong, Westerman, Hattori, McLeland & Naughton

[57] ABSTRACT

A tensioner for a chain or toothed belt which includes an oil reservoir. Oil contained in the oil reservoir is hermetically sealed by a diaphragm fixed to the oil reservoir by a plug. A pressurizing means is mounted between the diaphragm and the plug. The pressurizing means includes a compression spring and a bowl-shaped spring seat. A diaphragm is urged by the pressurizing means. A detent portion, extending upwardly from the diaphragm, is integrally formed on the surface of the diaphragm facing the atmosphere. The spring seat includes a recess at the central portion of the spring seat so that the detent portion of the diaphragm is engaged with the recess preventing free movement between the diaphragm and the pressurizing means.

1 Claim, 4 Drawing Sheets

PREVENTIVE STRUCTURE FOR PREVENTING EXTRAORDINARY DEFORMATION OF A DIAPHRAGM OF AN OIL HERMETIC TYPE TENSIONER

BACKGROUND OF THE INVENTION

The present invention relates to a tensioner adapted for adjusting tensile force of a chain or a toothed belt, and more particularly pertains to a tensioner hermetically containing oil, wherein the oil hermetic type tensioner provides a preventive structure which prevents a diaphragm covering an oil reservoir from extraordinarily deforming.

FIG. 5 shows a conventional oil hermetic type tensioner 50 as disclosed in Japanese Utility Model Application Laid-open No. Hei 1-121755. A piston 54 divides an inside of a cylinder 52 into a high-pressure chamber 56 and a low-pressure chamber 58. The total volume of the high-pressure chamber 56 and the low-pressure chamber 58 changes depending on the slidably reciprocal movement of the piston 54. The oil reservoir 62 can absorb any change of the total volume of the high-pressure chamber 56 and the low-pressure chamber 58.

The foregoing oil hermetic type tensioner 50 includes a diaphragm 60 and a pressurizing means 64 on the atmosphere side of diaphragm 60. The pressurizing means 64 is made up of a combination of a compression spring 65 and a spring seat 66, or of a sponge. When the piston 54 moves frontward (in a right direction as viewed in FIG. 5), oil from the oil reservoir 62 and the low-pressure chamber 58 flows through the passages 68, 70 and valve 72 into the high-pressure-chamber 56, reducing the air pressure in pressurizing means 64 and the oil volume in reservoir 62 and low-pressure chamber 58. The pressurizing means 64 prevents the low-pressure chamber 58 from becoming negative pressure and assures smooth flow of oil.

However, the diaphragm 60 is not restricted by the pressurizing means 64. Because the tensioner 50 is used where there are a lot of vibrations, either the diaphragm 60 or the pressurizing means 64 repeats free movement. Such free movement may cause an extraordinary deformation in diaphragm 60 which is normally biased by the pressurizing means 64.

Free movement between the diaphragm 60 and the pressurizing means 64 may cause the diaphragm 60 to be worn away. Further, extraordinary deformation may cause the diaphragm 60, itself, to apply a partial force. Consequently, durability of the diaphragm 60 would decline and, if worse comes to worst, oil could leak out of the diaphragm 60, so that the tensioner 50 cannot really properly perform its intended function.

SUMMARY OF THE INVENTION

In view of the foregoing disadvantages inherent of the known type of oil hermetic type tensioner, the present invention provides a preventive structure for preventing extraordinary deformation of a diaphragm in the reservoir of a tensioner adapter wherein free movement between the diaphragm and the pressurizing means is prevented. Thus, the present invention provides a preventive structure for preventing extraordinary deformation of a diaphragm, wherein the diaphragm and the pressurizing means are not freely movable with respect to each other, thereby protecting the diaphragm against wear and abrasion and maintaining durability of the diaphragm.

The present invention provides a preventive structure for preventing extraordinary deformation of a diaphragm, wherein extraordinary deformation of the diaphragm, caused by an integrating free movement can be effectively prevented, thereby enabling the diaphragm to regularly transform and prolonging the longevity of the diaphragm.

To attain the foregoing, a structure for preventing extraordinary deformation of a diaphragm of an oil hermetic type tensioner according to one preferred mode of the present invention comprises an oil reservoir, a diaphragm hermetically sealing the oil in the oil reservoir and a pressurizing means mounted on the atmosphere side of the diaphragm, wherein a detent portion, for preventing free movement between the diaphragm and the pressurizing means, is mounted on the diaphragm, on the atmosphere side thereof, and such detent portion is engaged to the pressurizing means.

Constructed as described above, according to the present invention, the configuration of the diaphragm changes, depending on the increase or decrease of the amount of oil in the oil reservoir. Because the diaphragm is engaged to the pressurizing means by the detent portion, the diaphragm moves integrally with the pressurizing means, thereby avoiding free movement between the diaphragm and the pressurizing means.

Further, because the pressurizing means normally biases the diaphragm, free movement between the diaphragm and the pressurizing means is prevented by engaging the detent portion to the pressurizing means. Because the diaphragm is made of rubber and formed thin for flexibility, it is preferable to form the detent portion on the diaphragm.

DETAILED DESCRIPTION OF THE PREFERRED EMBODIMENT

Preferred embodiments of the present invention will now be described in detail with reference to the accompanying drawings. Because the basic structure of the oil hermetic type tensioner of the present invention and the conventional tensioner are substantially the same, the structure characteristic of the present invention a described hereinbelow.

Figure 1:
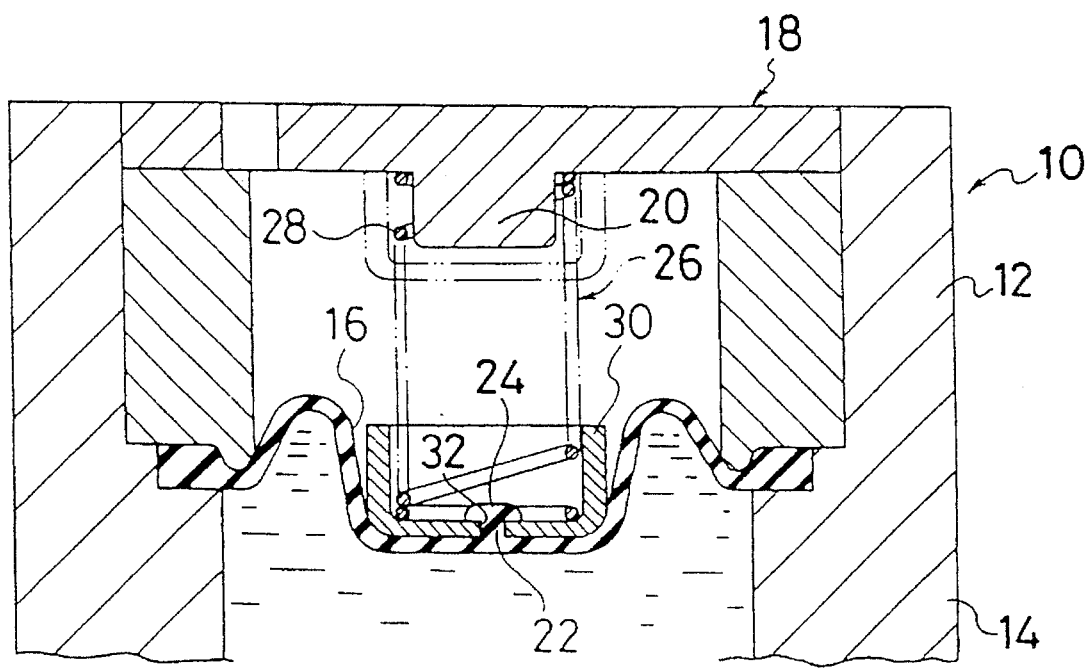
FIG. 1 shows a fragmentary sectional view of one embodiment of the tensioner for preventing extraordinary deformation of a diaphragm according to the present invention.

Referring to FIG. 1, tensioner 10 includes an oil reservoir 12 formed integral with a housing 14 of the tensioner 10. The present invention can be adapted to the tensioner wherein the oil reservoir 12 is mounted separately from the housing 14, or to the tensioner wherein oil reservoir 12 is integrally formed with a low-pressure chamber.

Oil contained in the oil reservoir 12 is hermetically sealed by the diaphragm 16 fixed at its periphery to the oil reservoir 12 by a plug 18. The diaphragm 16 is made of rubber and at the central portion is provided with a detent portion 22, on the atmosphere side of the diaphragm and having an extended head portion 24 formed thereon.

A pressurizing means 26 is mounted between the diaphragm 16 and the plug 18 and includes a compression spring 28 and a bowl-shaped spring seat 30. The compression spring 28 is fitted at one end of its ends around a projecting portion 20 of the plug 18 and, at its other end is seated in spring seat 30 so that radial movement of the compression spring 28 is prevented. The compression spring 28 urges the diaphragm 16 through the spring seat 30. The spring seat 30 includes a through hole 32, at the central portion thereof, so that the detent portion 22 of the diaphragm 16 is engaged therethrough.

Figure 2:
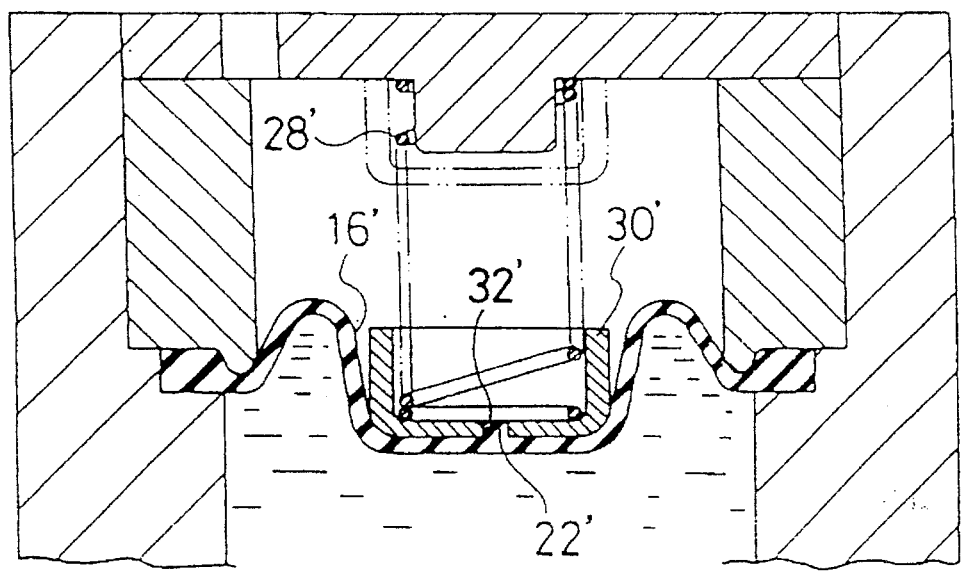
FIG. 2 shows a fragmentary sectional view of another embodiment of the tensioner including the preventive structure for preventing extraordinary deformation of a diaphragm according to the present invention.
Figure 3:
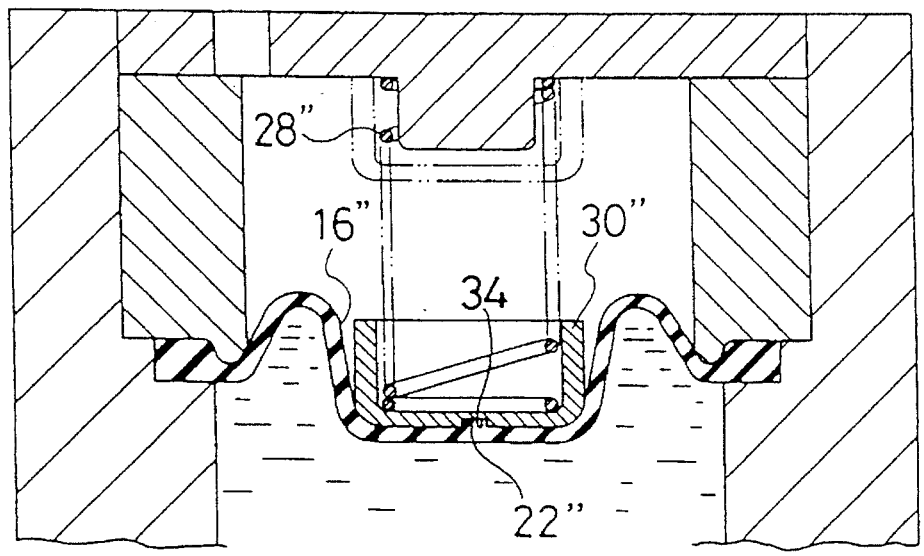
FIG. 3 shows a fragmentary sectional view of still another embodiment of the tensioner for preventing extraordinary deformation of a diaphragm according to the present invention.
Figure 4:
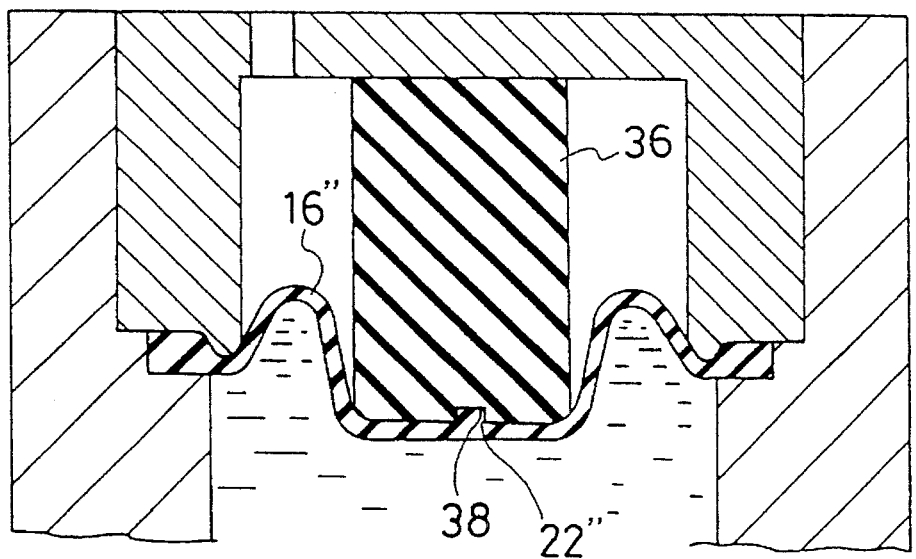
FIG. 4 shows a fragmentary sectional view of yet another embodiment of the tensioner for preventing extraordinary deformation of a diaphragm according to the present invention.
Figure 5:
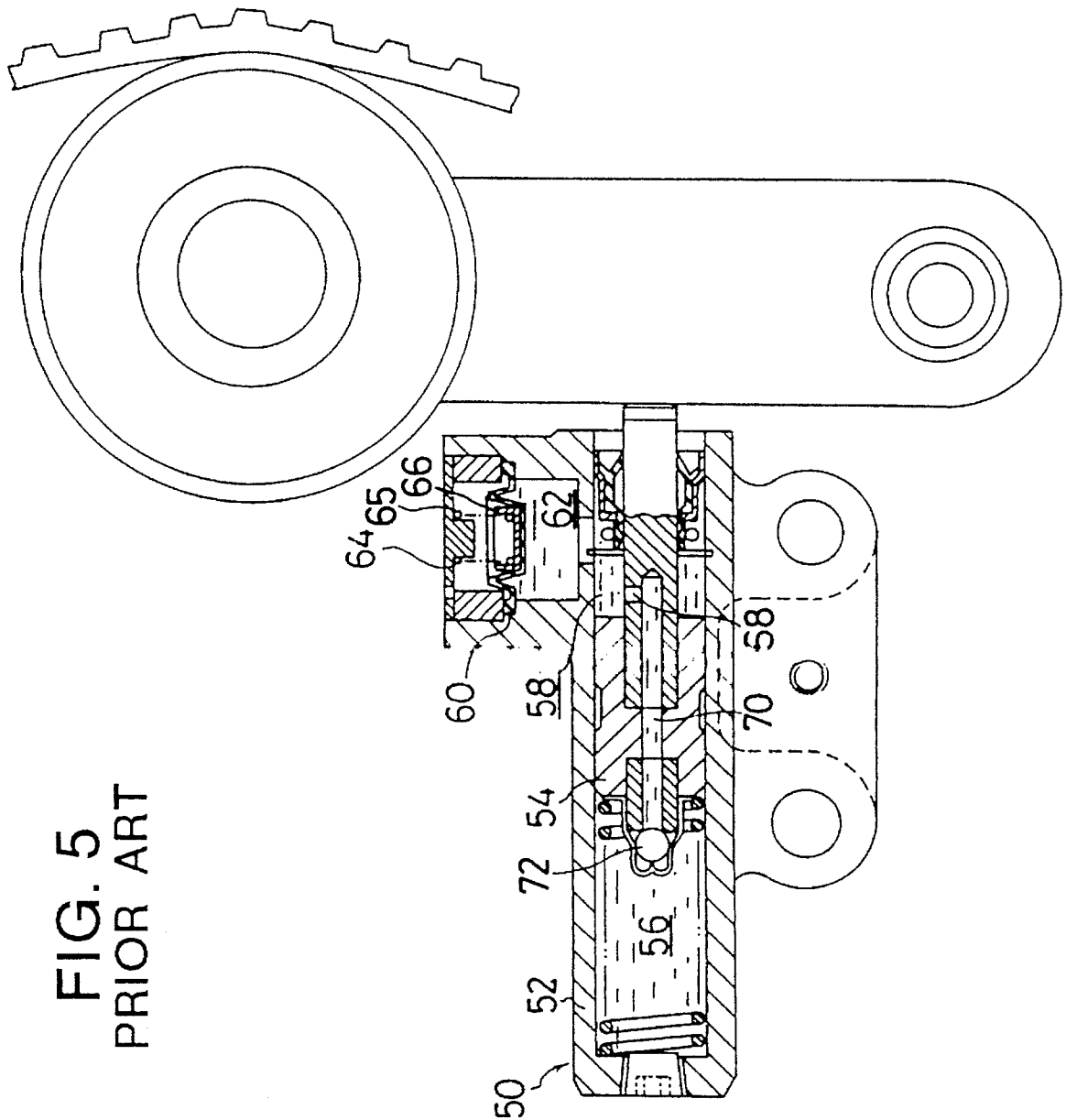
FIG. 5 shows a sectional view of the conventional tensioner.
Figure 6:
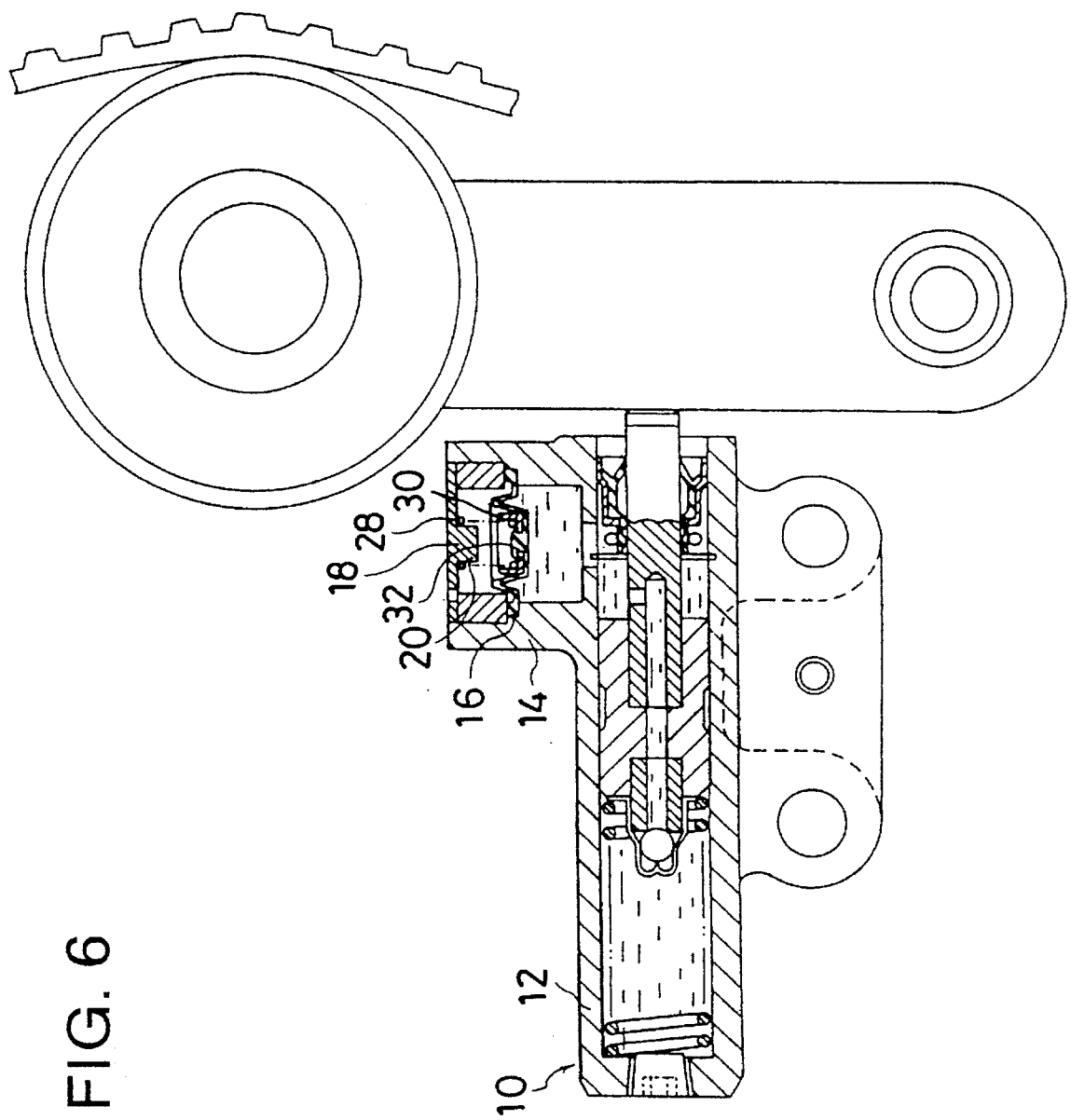
FIG. 6 shows a sectional view of an embodiment of the tensioner for preventing extraordinary deformation of the diaphragm according to the present invention.

FIGS. 2 through 4 illustrate other examples of the tensioner of the invention including the preventive structure for preventing extraordinary deformation of a diaphragm.

As shown in FIG. 2, a diaphragm 16' comprises a cylindrical detent portion 22' engaged to a through hole 32 of a spring seat 30'. The detent portion 22' is interposed in a bore of the through hole 32', with or without a gap therebetween. Because the spring seat 30' is urged to the diaphragm 16' by a compression spring 28', the spring seat 30' would not come off from the diaphragm 16' even with a gap therebetween.

As shown in FIG. 3, a diaphragm 16" comprises a cylindrical detent portion 22". The height of the detent portion 22" is shorter than the thickness of a spring seat 30". The spring seat 30" includes a recess portion 34 on a lower surface facing the diaphragm 16", through which the detent portion 22" is engaged. Because a compression spring 28" urges the spring seat 30" toward the diaphragm 16", the free movement between the diaphragm 16" and the spring seat 30" is prevented simply by fitting the detent portion 22" into the recess portion 34.

As shown in FIG. 4, a compressible sponge 36 may be used as a pressurizing means, wherein the detent portion 22" is fitted in a recess portion 38 of the sponge 36.

The terms and expressions which have been employed herein are used as terms of description and not of limitation, and there is no intent, in the use of such terms and expressions, of excluding any of the equivalents of the features shown and described or portions thereof, but it is recognized that various modifications are possible within the scope of the invention claimed.

What is claimed is:

1. An oil hermetic type tensioner, comprising:

a cylinder;

a piston dividing an inside of said cylinder into a high-pressure chamber and a low-pressure chamber;

a housing defining an oil reservoir hydraulically communicating with said low-pressure chamber;

a diaphragm in said housing dividing said oil reservoir into an oil side and an atmosphere side and being operative to hermetically seal oil in said oil side of said oil reservoir;

means in said housing for pressurizing including a resilient body disposed in the atmosphere side of said reservoir, and means associated with said body for engaging said diaphragm on the atmosphere side thereof, said pressurizing means being operative to resist excessive deflection of said diaphragm; and means for preventing free movement between said diaphragm and said pressurizing means including a detent projecting from said diaphragm on the atmosphere side thereof, and means associated with said diaphragm engaging means operative to retain said detent, whereby said detent is connected to said pressurizing means, so that free movement between said diaphragm and said pressurizing means is prevented.

\* \* \* \* \*